United States Patent [19]

Tsukahara

[11] Patent Number: 4,612,588
[45] Date of Patent: Sep. 16, 1986

[54] HEAD MOVING APPARATUS USING STEPPING MOTOR

[75] Inventor: Nobuhiko Tsukahara, Kanagawa, Japan

[73] Assignee: Sony Corporation, Tokyo, Japan

[21] Appl. No.: 717,792

[22] Filed: Mar. 29, 1985

[30] Foreign Application Priority Data

Mar. 31, 1984 [JP] Japan .................................. 59-64902
Apr. 2, 1984 [JP] Japan ............................ 59-46691[U]

[51] Int. Cl.⁴ ...................... G11B 21/08; H02K 29/04
[52] U.S. Cl. ...................................... 360/78; 318/685; 318/696; 360/77
[58] Field of Search ....................... 360/77, 78, 97–99, 360/106, 105, 109; 318/685, 696; 369/32, 33

[56] References Cited

U.S. PATENT DOCUMENTS 4,356,522 10/1982 Takano et al. ......................... 360/77
4,423,447 12/1983 Nishida et al. ...................... 360/106
4,437,049 3/1984 Tullos et al. ......................... 318/685
4,489,259 12/1984 White et al. ......................... 318/685
4,490,662 12/1984 Moribe et al. ....................... 318/685

Primary Examiner—Raymond F. Cardillo
Assistant Examiner—Steven R. Garland
Attorney, Agent, or Firm—Lewis H. Eslinger; Alvin Sinderbrand

[57] ABSTRACT

A head moving apparatus using a stepping motor which comprises a reversible stepping motor for moving a head and a motor drive control apparatus for driving the stepping motor in alternate forward and reverse directions through switching of excitation phases of the motor after the motor has been driven in one direction, thereby eliminating errors of the step position of the stepping motor due to a hysteresis characteristic thereof. The head thus can be stopped at the same position irrespective of whether it is accessed in the forward or reverse direction.

4 Claims, 6 Drawing Figures

F I G. 1
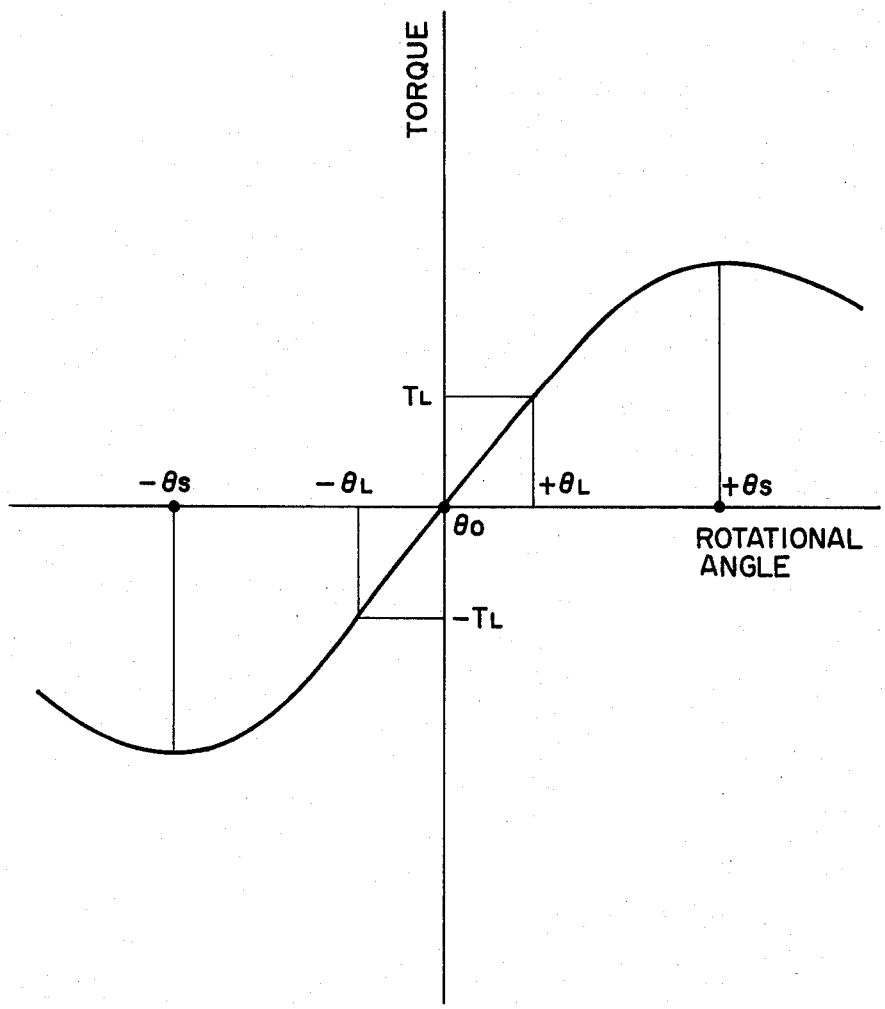

FIG. 4
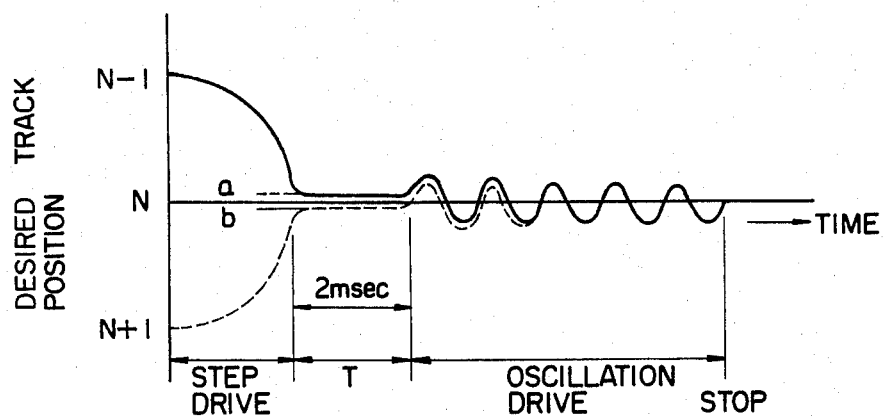
FIG. 5
FIG. 6
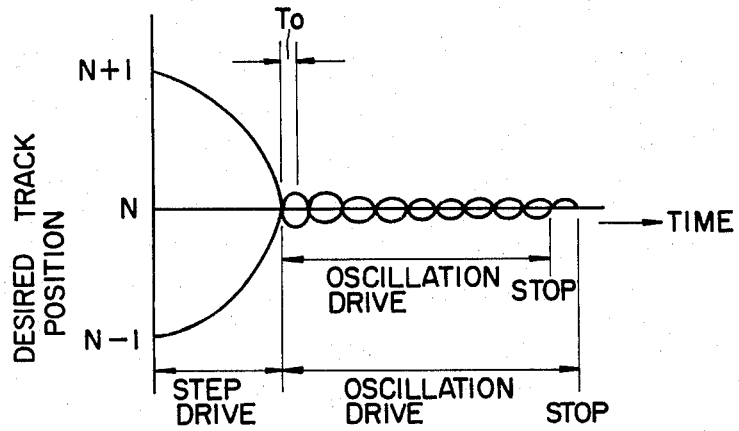

HEAD MOVING APPARATUS USING STEPPING MOTOR

BACKGROUND OF THE INVENTION

1. Field of the Invention:

This invention relates to a head moving apparatus for moving a magnetic head or the like for writing or reading a signal in or out of a floppy disk to a desired position and, more particularly, to a head moving apparatus using a stepping motor.

2. Description of the Prior Art:

The stepping motor usually has a hysteresis characteristic, due to which it is stopped at a deviated position after the completion of driving if there has been a load on its output shaft. More specifically, the stepping motor has an output torque characteristic as shown in FIG. 1. Under an ideal load-free condition, the rotor can be driven to and stopped at a position $\theta_0$, at which the generated torque is zero either in the forward or reverse direction with a step angle $\theta_s$ in a range of $+\theta_s$ and $-\theta_s$. However, if there is a load applied to the rotor, i.e., output shaft thereof, the rotor cannot be driven in an output torque range $+\theta_L$ to $-\theta_L$ below the load torque T. Therefore, the rotor is stopped, and the stop position of the rotor is determined in the aforementioned range of $+\theta_L$ to $-\theta_L$ due to momentum of the rotor including the load. Therefore, the rotor is stopped at different positions depending on whether the stepping motor is driven forwardly or reversely.

For example, when the head is moved from a position of a (N+1)-th address to a position of a N-th address as shown in FIG. 4, it is stopped at position a, whereas when it is moved from a position of a (N−1)-th address to a position of the N-th address, it is stopped at a position b.

In the usual floppy disk apparatus, there are cases when the magnetic head is moved to a desired track position on the floppy disk from the side of the center of the disk toward the outer periphery thereof and also from the side of the outer periphery of the disk toward the center thereof. Therefore, a head moving apparatus is necessary, which can move the magnetic head in either direction.

The head moving apparatus is required to accurately stop the magnetic head at a desired track position on the disk when the head is moved in either direction.

In case of a head moving apparatus, in which the head is moved using a stepping motor, however, it is difficult to accurately stop the head at a desired position due to the hysteresis characteristic of the stepping motor as noted above. Particularly, where this head moving apparatus is employed in a floppy disk apparatus which is arranged to reduce the track pitch so as to increase the recording density, it is impractical unless errors in the stop position of the head due to the hysteresis characteristic are reduced.

OBJECT OF THE INVENTION

The present invention has an object of increasing the recording density of the floppy disk apparatus by the provision of a head moving apparatus using a stepping motor having a novel structure, which eliminates the errors of the stop position of the head due to the stepping motor hysteresis characteristic as noted above and permits the head to be smoothly moved to and accurately stopped at a desired position.

SUMMARY OF THE INVENTION

According to the present invention, there is provided a head moving apparatus using a stepping motor which comprises a reversible stepping motor for moving a head and a motor drive control means for driving the stepping motor in alternate forward and reverse directions through switching of excitation phases of the motor after the motor has been step driven in one direction, thereby eliminating errors of the stop position of the stepping motor due to a hysteresis characteristic thereof. After the motor is step driven in either forward or reverse direction, it is reciprocated through the alternate forward and reverse directions before it is stopped. Thus, the head can be stopped at the same position irrespective of whether it is accessed in the forward or reverse direction.

Further according to the present invention, the head can be smoothly moved to and accurately stopped at a desired position without generation of noise due to reciprocal driving for each step.

BRIEF DESCRIPTION OF THE DRAWINGS

FIG. 1 is a graph showing the output torque characteristic of a usual stepping motor;

FIG. 4 is a view showing a manner of driving of a stepping motor in the embodiment shown in FIG. 2;

FIG. 5 is a view showing the contents of oscillation drive pattern data stored in a first memory of a different embodiment of the present invention; and FIG. 6 is a view showing a manner of driving of a stepping motor in the different embodiment.

DESCRIPTION OF THE PREFERRED EMBODIMENTS

Now, an embodiment of the head moving apparatus using a stepping motor according to the present invention will be described with reference to the drawings.

Figure 2:
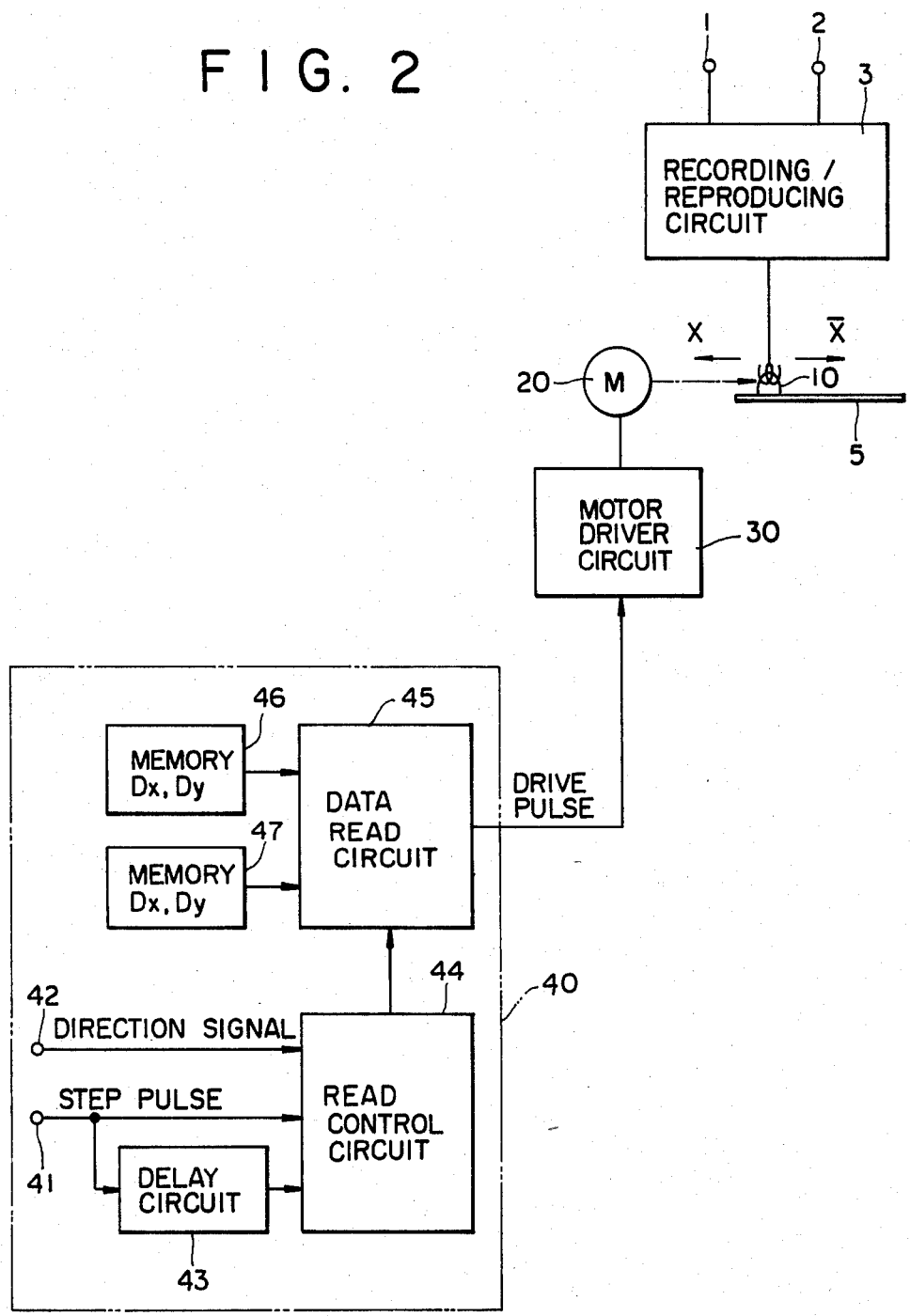
FIG. 2 is a block diagram showing an embodiment of the present invention applied to a floppy disk apparatus.

Referring to the block diagram of FIG. 2, there is shown an embodiment of the present invention which is applied to a floppy disk apparatus. In this system, recording data supplied from a data input terminal 1 to a recording/reproducing circuit 3 is recorded on recording tracks of a floppy disk 5 by a magnetic head 10, and reproduced data obtained as the recording tracks of the floppy disk 5 are traced by the magnetic head 10 is provided from a data output terminal 2 through the recording/reproducing circuit 3.

The magnetic head 10 is movable either from the side of the radial center of the floppy disk 5 toward the outer periphery thereof (i.e., in the direction of arrow X in FIG. 2) or from the side of the outer periphery of the disk to the radial center thereof (i.e., in the direction of arrow $\overline{X}$ in FIG. 2) to thereby be brought to a desired track position using a stepping motor 20.

In this embodiment, the stepping motor 20 is reversible. When it is driven forwardly, it moves the magnetic head 10 toward the outer periphery of the floppy disk 5 (i.e., in the direction of arrow X in FIG. 2). When it is driven reversely, it moves the magnetic head 10 toward the center of the floppy disk 5 (i.e., in the direction of arrow $\overline{X}$ in FIG. 2). It is driven by a motor driver circuit 30 according to drive control pulses from a motor drive control circuit 40 such that it is stopped at a desired track position on the floppy disk 5. The stepping motor 20 is a four-phase stepping motor and can move the magnetic head 10 by one track pitch of the floppy disk 5 in two steps.

A step pulse signal is supplied from a microcomputer or the like (not shown) to a first input terminal 41 of the motor drive control circuit 40, and a direction signal is supplied from the microcomputer or the like to a second input terminal 42. The motor drive control circuit 40 includes a first memory 46, in which is stored step drive pattern data for step driving the stepping motor 20 in the forward and reverse directions, a second memory 47, in which is stored oscillation drive pattern data for driving reciprocally the stepping motor 20 in alternate forward and reverse directions, a data reading circuit 45 for reading data from the first and second memories 46 and 47, and a read control circuit 44 for controlling the operation of the data reading circuit 45. The step pulse signal is supplied from the first input terminal 41 to the read control circuit 44 both directly and through a delay circuit 43. The direction signal is supplied from the second input terminal 42 to the read control circuit 44.

The read control circuit 44 causes the data read circuit 45 to read out step drive pattern data $D_X$, $D_Y$ for step driving the stepping motor 20 either forwardly or reversely from the first memory 46 according to the direction signal and step pulse signal. After the lapse of a predetermined period of time (T) from the instant of completion of the read-out of the step drive pattern data $D_X$, $D_Y$, the read control circuit 44 causes the data read circuit 45 to read out oscillation drive pattern data $D_x$, $D_y$ for driving reciprocally the stepping motor 20 in alternate forward and reverse directions from the second memory 47 according to the step pulse signal supplied through the delay circuit 43. The read-out data is supplied as drive control pulse signal to the motor driver circuit 30.

Figure 3:
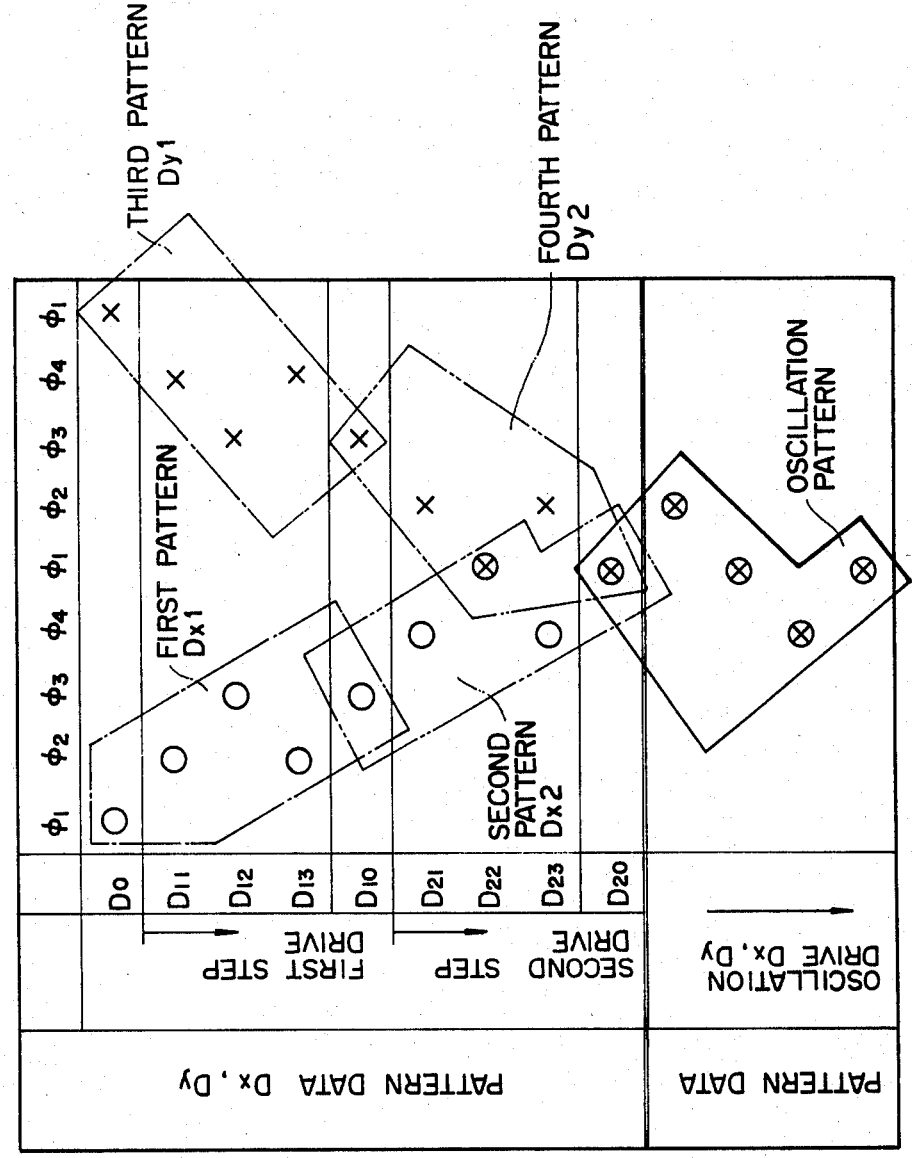
FIG. 3 is a view showing the contents of step drive pattern data and oscillation drive pattern data stored in memories of the embodiment shown in FIG. 2.

FIG. 3 shows the first and second memories 46 and 47 in this embodiment. In the first memory 46 are stored forward step drive pattern data $D_x$ for forwardly driving the stepping motor 20 through successive switching of excitation phases $\phi_1$, $\phi_2$, $\phi_3$ and $\phi_4$ and reverse step drive pattern data $D_y$ for reversely driving the motor.

The forward step drive pattern data $D_x$ includes first pattern data $D_{x1}$ for starting the excitation from the first excitation phase $\phi_1$, and second pattern data $D_{x2}$ for starting the excitation from the third excitation phase $\phi_3$. Likewise, the reverse step drive pattern data $D_y$ includes first pattern data $D_{y1}$ for starting the excitation from the first excitation phase $\phi_1$ and second pattern data $D_{y2}$ for starting the excitation from the third excitation phase $\phi_3$.

In the second memory 47 is stored oscillation drive pattern data $D_x$, $D_y$ for driving reciprocally the stepping motor 20 with alternate excitation phases $\phi_2$ and $\phi_4$ respectively leading and lagging behind the excitation phase $\phi_1$ corresponding to a track position step on the floppy disk 5. In FIG. 3, the circle marks designate the excitation phases $\phi_1$, $\phi_2$, $\phi_3$ and $\phi_4$ in the case of the forward step drive, and cross marks designate the excitation phases $\phi_1$, $\phi_2$, $\phi_3$ and $\phi_4$ in the case of the reverse step drive.

In this embodiment which is provided with the motor drive control circuit 40 as described above, when the magnetic head 10 is moved to the desired track position N on the floppy disk 5 either with the forward or reverse run of the stepping motor 20, it is driven in the forward and reverse directions alternately with respect to the excitation phase $\phi_1$ corresponding to that position N as shown in FIG. 4. Thus, irrespective of whether the stepping motor 20 is driven forwardly or reversely to bring the megnetic head 10 to the desired track position N, the motor is stopped at the same position after it has been subsequently driven in the alternate forward and reverse directions. That is, irrespective of whether the magentic head 10 is brought to the desired track position N with the forward or reverse run of the stepping motor 20, with the subsequent alternate forward and reverse driving of the motor with respect to the phase corresponding to the desired track position N, the stroke of reciprocation of the stepping motor 20 settles to a constant value, and the stop position of the motor can be absolutely determined by the constant reciprocation stroke. It has been found that causing the reciprocation of the motor for each address at the time of continuous feed would produce noise. The generation of noise can be prevented by inhibiting the reciprocal driving of the motor during a period, during which a pulse for moving the head to the next track is expected to appear (i.e., period T shown in FIG. 4).

In the above embodiment, the oscillation drive pattern data $D_x$, $D_y$ as shown in FIG. 3 is read out from the second memory 47 to cause reciprocal driving of the stepping motor 20 with respect to the phase corresponding to the desired track position N in a fixed mode for either case of forward and reverse step drive. However, it is also possible to store in the second memory 47 the oscillation drive pattern data $D_x$, $D_y$ which correspond to the respective forward and reverse runs of the stepping motor 20 to bring the magnetic head 10 to the desired track position N, so that the motor 20 can be reciprocally driven with respect to the desired track position N in opposite phase relation in case when the motor is driven forwardly and case when the motor is driven reversely. In this case, after the step drive pattern data $D_x$, $D_y$ has been read out from the first memory 46, the read control circuit 44 causes the data read circuit 45 to read out the oscillation drive pattern data $D_x$ or $D_y$ from the second memory 47 according to the direction signal and step pulse signal, whereby the reciprocal driving of the stepping motor can be ended, i.e., the motor can be stopped, in the same phase. In this way, it is possible to stop the stepping motor 20 accurately at the desired track position N.

In FIG. 5, circle marks designate the excitation phases $\phi_1$, $\phi_2$, $\phi_3$ and $\phi_4$ in case of the forward step drive, and cross marks designate the excitation phases $\phi_1$, $\phi_2$, $\phi_3$ and $\phi_4$ in case of the reverse step drive.

In the above embodiment, in which the stepping motor 20 is reciprocally driven with respect to the desired track position N in opposite phase relation in case of the forward step drive and in case of the reverse step drive, the possibility of noise generation can be reduced when the magnetic head 10 is moved by the continuous step feed to the desired track position N.

More specifically, in case of moving the magentic head 10 by the continuous step feed to the desired track position N, if the period of step pulses supplied to the first input terminal 41 is extended, the reciprocal run noted above would be started for each step feed, so that noise is liable to be generated due to this reciprocal run. However, with the stepping motor 20 driven such that its reciprocal drive starts in the same direction as the step feed, the motor 20 can be driven smoothly at the start of the reciprocal drive. Therefore, even if the reciprocal drive is started for each step feed, no noise would be generated due to the reciprocal drive so long as it is in a period To as shown in FIG. 6.

As has been described in the foregoing, with the head moving apparatus using a stepping motor according to the present invention the stepping motor for moving the magnetic head to a desired position is driven in the alternate forward and reverse directions with the switching of its excitation phase with respect to the desired stop position after it has been driven in either forward or reverse direction, so that it is possible to eliminate errors in the head stop position due to the hysteresis characteritic of the stepping motor and stop the head accurately at the desired position. The head moving apparatus using a stepping motor according to the present invention thus permits high density recording when it is applied to the floppy disk apparatus. Further, with the head moving apparatus using a stepping motor according to the present invention the reciprocal drive of the stepping motor after the step drive thereof is started in the same direction as the direction of the step feed to the desired position, so that it is possible to prevent noise due to the reciprocal drive for each step feed and smoothly bring the head to and accurately stop it at the desired position. Further, according to the present invention the desired object can be attained sufficiently.

What is claimed is:

1. A head moving apparatus using a stepping motor, in which in a recording/reproducing apparatus a signal conversion head is moved by a stepping motor from a first address position to a second address position corresponding to respective recording tracks formed on a recording medium, comprising:

(a) means for generating a signal indicative of the rotational direction or rotational angle of said stepping motor in relation to said first and second address positions;

(b) first memory means for storing therein at least one drive pattern for driving said stepping motor for moving said signal conversion head from said first address position to said second address position;

(c) second memory means for storing therein a second drive pattern for reciprocally driving said stepping motor in alternate forward and reverse directions when said signal conversion head has reached said second address position;

(d) means controlled by said means for generating said signal indicative of the rotational direction or rotational angle for reading said at least one and second drive patterns from said first and second memory means; and (e) drive means for driving said stepping motor according to the drive patterns read out by said drive pattern reading means.

2. The head moving apparatus using a stepping motor according to claim 1, wherein said second drive pattern is such that said stepping motor is always stopped immediately before it is driven in a fixed driving direction.

3. The head moving apparatus using a stepping motor according to claim 2, wherein at least two drive patterns are stored in said first memory means.

4. The head moving apparatus using a stepping motor according to claim 3, wherein said means for generating said signal indicative of the rotational direction or rotational angle includes means for delaying the start of the reciprocal drive of the stepping motor through control of said drive pattern reading means.

* * * * *